United States Patent
Brand et al.

(10) Patent No.: US 10,061,071 B2
(45) Date of Patent: Aug. 28, 2018

(54) PANEL LUMINAIRE

(71) Applicant: PHILIPS LIGHTING HOLDING B.V., Eindhoven (NL)

(72) Inventors: Christo Philip Brand, Langley (CA); Adrian John Frederick Weston, Langley (CA); Ryan Robert James Gates, Langley (CA); Kwong Hung Man, Langley (CA)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 222 days.

(21) Appl. No.: 14/997,610

(22) Filed: Jan. 18, 2016

(65) Prior Publication Data

US 2016/0216429 A1    Jul. 28, 2016

Related U.S. Application Data

(60) Provisional application No. 62/106,256, filed on Jan. 22, 2015.

(51) Int. Cl.
*F21V 8/00* (2006.01)

(52) U.S. Cl.
CPC ........... *G02B 6/004* (2013.01); *G02B 6/0045* (2013.01); *G02B 6/0068* (2013.01)

(58) Field of Classification Search
None
See application file for complete search history.

(56) References Cited

U.S. PATENT DOCUMENTS

| 6,016,038 | A | 1/2000 | Mueller | |
|---|---|---|---|---|
| 6,211,626 | B1 | 4/2001 | Lys | |
| 6,247,826 | B1* | 6/2001 | Funamoto | G02B 6/0038 349/63 |
| 7,210,839 | B2* | 5/2007 | Jung | G02B 6/003 362/555 |
| 2004/0130912 | A1* | 7/2004 | Miyashita | G02B 6/002 362/561 |
| 2004/0196667 | A1* | 10/2004 | Lea | G02B 6/0046 362/583 |
| 2007/0146569 | A1* | 6/2007 | Nouchi | G02B 6/0088 349/58 |

(Continued)

OTHER PUBLICATIONS

Cooper Lighting—Metalux, 2014.

*Primary Examiner* — Britt D Hanley
(74) *Attorney, Agent, or Firm* — Akarsh P. Belagodu

(57) ABSTRACT

In various embodiments, a panel luminaire (300, 400, 500) may include a housing (302, 402) that frames a light aperture (304, 404), a linear substrate (308, 408) mounted to the housing along a first plane, at least one light source (306, 406) mounted along the linear substrate to emit light along the first plane, and a planar light guide (310, 410, 510) mounted to the housing parallel to the first plane. The planar light guide may include a light extraction feature (312) to extract light emitted by the at least one light source. In some embodiments, a portion (334) of a periphery (314) of the planar light guide may be curved to redirect light emitted by the at least one light source towards the light extraction feature. In some embodiments, the planar light guide and an aesthetic panel (418, 518) of the housing may be spaced apart to form a gap (420, 520) big enough to allow for the aesthetic panel to be three dimensional.

13 Claims, 4 Drawing Sheets

(56) References Cited

U.S. PATENT DOCUMENTS

| | | | | |
|---|---|---|---|---|
| 2008/0285310 A1* | 11/2008 | Aylward | ................ | G02B 6/001 362/626 |
| 2010/0027293 A1* | 2/2010 | Li | ..................... | G02B 6/002 362/619 |
| 2010/0321952 A1* | 12/2010 | Coleman | ................... | F21S 8/04 362/607 |
| 2012/0170260 A1* | 7/2012 | Gardner | ............... | G02B 6/0045 362/217.06 |
| 2013/0003398 A1* | 1/2013 | Godbillon | ........... | F21S 48/2237 362/511 |
| 2013/0307420 A1* | 11/2013 | Yoder | ................... | F21V 33/006 315/158 |

* cited by examiner

PANEL LUMINAIRE

CROSS-REFERENCE TO PRIOR APPLICATION

This application claims the benefit of U.S. Provisional Application No. 62/106,256, filed on Jan. 22, 2015, which is hereby incorporated by reference herein.

TECHNICAL FIELD

The present invention is directed generally to lighting and luminaires. More particularly, various inventive methods and apparatus disclosed herein relate to a panel luminaire with various features.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Existing luminaires commonly used in existing buildings often must conform with commonplace architectural constraints. For example, ceilings in commercial and government buildings may have standard-sized panels for receiving architectural components such as panel luminaires and tiles. Panel luminaires built for installation into these types of environments—and the light sources employed in those panel luminaires—may therefore have standard sizes and may be manufactured in bulk, making alterations to these panels difficult.

In many panel luminaire configurations, at least some light from one or more light sources is extracted (e.g., by a light guide panel) but misdirected somewhere other than to the environment to be lighted (e.g., over an edge of the panel housing and/or over a T-bar of the ceiling). This may lead to optical losses and/or lower luminaire efficacy. Additionally, in many panel luminaire configurations, light remains unextracted and is instead wasted inside of the luminaire's housing. Further, in many panel luminaires, the components (e.g., reflective layer, light guide panel, dispersion aesthetic panel) are "sandwiched" tightly together, leaving little to no room for architectural features. Thus, there is a need in the art to create new panel luminaires, or to modify existing panel luminaires, to extract light more efficiently and to be able to receive three-dimensional architectural details.

SUMMARY

The present disclosure is directed to inventive methods and apparatus for lighting and luminaires. For example, in various embodiments, a light guide panel for use in a panel luminaire may be designed to efficiently extract light from one or more light sources. Additionally, in various embodiments, a panel luminaire may be configured so that rather than being "sandwiched" together, components are spaced apart, e.g., to permit incorporation of three-dimensional architectural details within the panel luminaire.

Generally, in one aspect, a panel luminaire may include: a housing that frames a light aperture; a linear substrate mounted to the housing along a first plane; at least one light source mounted along the linear substrate to emit light along the first plane; and a planar light guide mounted to the housing parallel to the first plane and including a light extraction feature to extract light emitted by the at least one light source, wherein at least a portion of a periphery of the planar light guide not parallel to the linear substrate is curved to redirect light emitted by the at least one light source towards the light extraction feature.

In various embodiments, the portion of the periphery not parallel to the linear substrate is curved inwardly. In various embodiments, an inward face of the portion of the periphery not parallel to the linear substrate is reflective. In various embodiments, the light extraction feature comprises a modulated dot pattern. In various versions, dots of the dot pattern include hexagons, squares, circles, or diamonds. In various versions, dots of the dot pattern are laser etched into the planar light guide. In various versions, dots of the dot pattern are silk-screened into the planar light guide.

In various embodiments, the light extraction feature comprises micro-lenses thermally embossed into the planar light guide. In various embodiments, the light extraction feature comprises microstructure film laminated on rigid acrylic panels. In various embodiments, the light extraction feature may include a distribution of individual light extraction features and the at least one light source comprises a plurality of light sources, wherein a density of the distribution is lower near each of the plurality of light sources than elsewhere in the planar light guide.

In various embodiments, a panel luminaire may additionally or alternatively include an aesthetic panel positioned across the light aperture and parallel to the planar light guide. In various embodiments, the planar light guide and the aesthetic panel are spaced apart to form a gap therebetween.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

As used herein, "light extraction features" are components, traditionally used in the television and display industry, that have more recently been incorporated into luminaires and lighting units. For example, light extraction features may be incorporated into or onto optical elements such as light guides to extract and/or redirect light as desired. Various types of light extract features may be used, including but not limited to dot pattern printing, thermal embossing (e.g., hot stamping), V-cutting, laser etching and/or microstructure extraction. The beam angle and extraction efficiency of light guides incorporating light extraction features may be dependent on things like the nature of the extraction features themselves, the density of the extraction features on or within the light guide, and a reflector positioned on a side of the light guide opposite of the environment being illuminated.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Luminaires used in existing buildings, such as panel luminaires used in ceilings, often must conform with architectural standards and thus may have standard sizes and may be manufactured in bulk. In many panel luminaire configurations, at least some light from one or more light sources is either extracted (e.g., by a light guide panel) but misdirected somewhere other than to the environment to be lighted (e.g., over an edge of the panel housing and/or over a T-bar of the ceiling), or remains unextracted and is instead wasted inside of the luminaire's housing. Further, in many panel luminaires, there is little to no room for architectural features. Thus, there is a need in the art to create new panel luminaires, or to modify existing panel luminaires, to extract light more efficiently and to be more flexible in including three-dimensional architectural details. In view of the foregoing, various embodiments and implementations of the present invention are directed to panel luminaires and light guides for use in panel luminaires.

Figure 1:
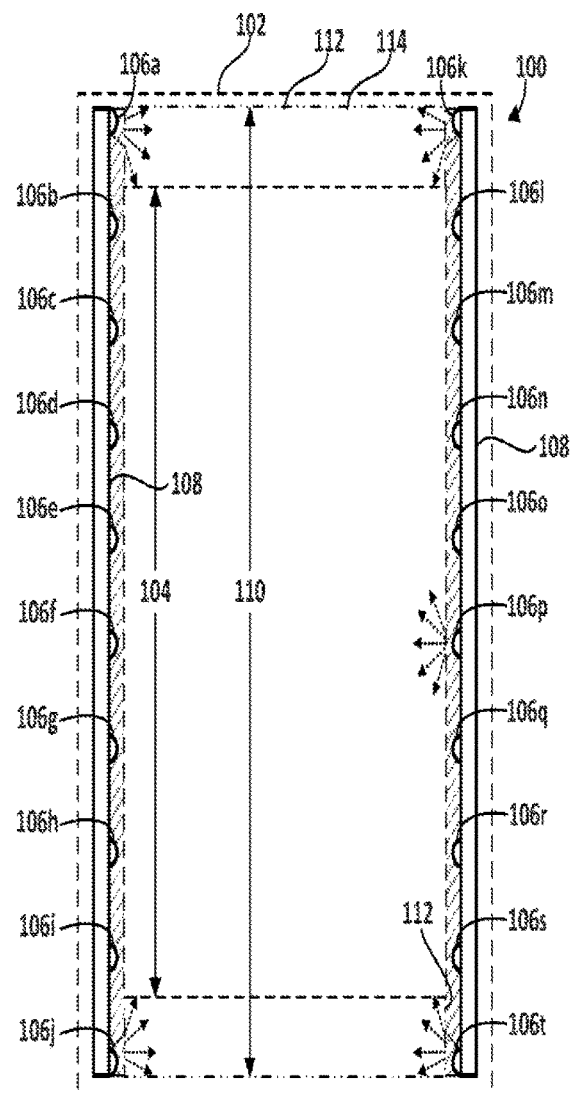
FIGS. 1 and 2 illustrate examples of panel luminaires in which light is either extracted but misdirected, or remains unextracted and effectively wasted.

Referring to FIG. 1, in one embodiment, a panel luminaire 100 includes a housing 102, which is depicted in phantom so that underlying components are visible. In FIG. 1, panel luminaire 100 is viewed from below, as it would appear to a user standing immediately below it when installed in a ceiling. However, this is not meant to be limiting. Panel luminaire 100 may be installed in or on surfaces other than a ceiling, such as on a wall or a floor. Housing 102 may define and/or frame a light aperture 104 that permits light emitted by a plurality of light sources 106a-t to pass through (and thus out from the page in FIG. 1).

A plurality of light sources 106a-t (referred to generically as "light sources 106") may be mounted to linear substrates 108, which in some embodiments may be printed circuit boards or "PCBs." Linear substrates 108 may be mounted to housing 102 along a first plane that is defined by panel luminaire 100 (e.g., parallel to the surface of the page). In various embodiments, plurality of light sources 106a-t may be positioned on linear substrates 108 so that they emit light along the first plane. In the example of FIG. 1, two linear substrates 108 include light sources 106 pointed at each other. However, this is not meant to be limiting. In some embodiments, only a single linear substrate 108 may be employed on one side. Additionally, in some embodiments, panel luminaire may have a non-rectangular shape, such as various polygons.

Light sources 106 may come in various forms. In FIG. 1, for instance, they may be LEDs or incandescent bulbs. However, in other embodiments, light sources 106 may take other forms, such as fluorescent tubes (extending parallel to linear substrate 108, for instance), halogen lamps, and so forth.

In FIG. 1, a planar light guide 110 is mounted to housing 102 parallel to the first plane defined by housing 102 (i.e., parallel to the plane of the page). Planar light guide 110 extends the entire length of linear substrate 108, so that its extremities (i.e., at the top and bottom in FIG. 1) are approximately flush with those of linear substrate 108. Planar light guide 110 may include one or more light extraction features 112 (indicated by the dash-dot-dot-dash line) to extract light emitted by one or more of plurality of light sources 106a-t. In this example, light extraction features 112 extend around a periphery 114 of planar light guide 110.

Although not depicted in FIG. 1, in various instances, a surface above (i.e. "behind" from the perspective of the reader looking at the page) planar light guide 110 may be reflective, e.g., to reflect light rays that pass towards it (i.e. into the page) back into planar light guide 110 so that they pass through light aperture 104 and are utilized for illumination. An aesthetic panel is also not depicted in FIG. 1 (so that components underneath are visible; an example aesthetic panel will be depicted in FIG. 4), but may extend across light aperture 104. This aesthetic panel may be clear, dispersive, colored, tinted, etc.

Light sources 106a, 106j, 106k, and 106t, situated at the extreme ends of linear substrate 108, emit light rays that are extracted by light extraction features 112 and dispersed through planar light guide 110 as loosely represented by the dashed-line arrows. Because linear substrate 108 is longer than the light aperture 104 of panel luminaire 100, at least some of the light extracted from light sources 106a, 106j, 106k, and 106t remains behind housing 102. Thus, these particular extracted light rays do not pass through light aperture 104 and are not utilized to illuminate the area underneath (or otherwise situated outwardly from) panel luminaire 100. This is in contrast to, say, light rays emitted by light source 106p, which are extracted by light extraction features 112 into planar light guide 110 so that they nearly all pass through light aperture 104.

Figure 2:
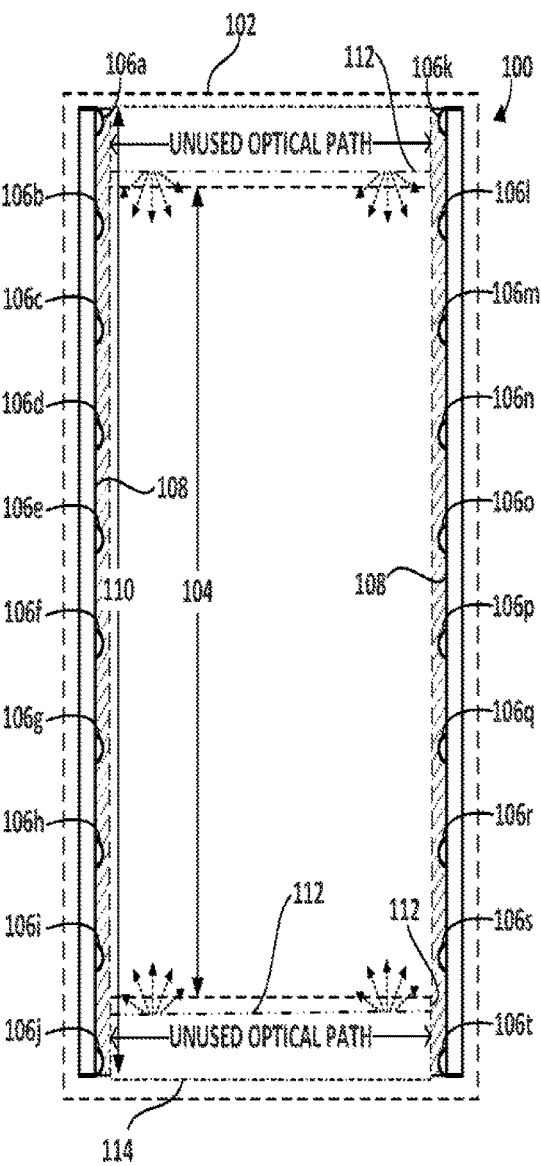

FIG. 2 depicts a similar panel luminaire 100 with the same components as in FIG. 1, (and therefore these components need not be described in detail again). In FIG. 2, instead of being disposed on periphery 114 of planar light guide 110 (at least at the top and bottom ends), light extraction features 112 are inset from the periphery. Portions of periphery 114 of planar light guide 110 without extraction features 112 are depicted with dash-dash-dot-dash-dash lines. In this example, at least some light rays from light sources 106a, 106j, 106k, and 106t are extracted by light extraction features 112, dispersed into planar light guide 110 as indicated by the dashed arrows, and thus, usefully pass through light aperture 104. However, there is still an optical path behind housing 102 that lacks light extraction, and therefore, at least some light goes to waste.

Figure 3:
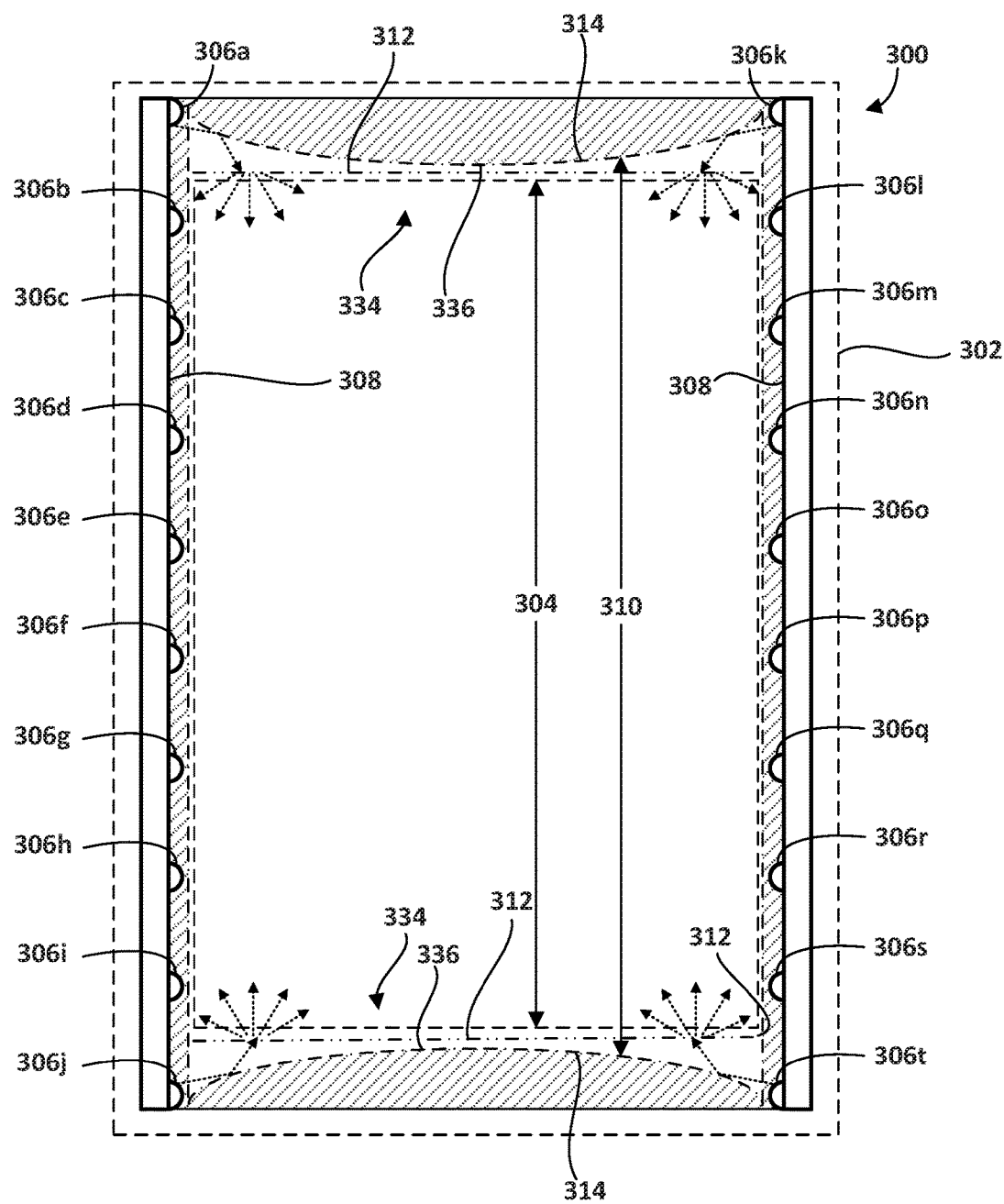
FIG. 3 depicts an example of a panel luminaire with a light guide configured with selected aspects of the present disclosure, in accordance with various embodiments.

FIG. 3 demonstrates one manner of more efficiently harvesting light than was shown in FIGS. 1 and 2. FIG. 3 depicts a panel luminaire 300 that includes similar components as those of FIGS. 1 and 2, and therefore, those components are labeled similarly, except with a "3" rather than a "1." In FIG. 3, planar light guide 310 extends beyond light aperture 304 on both ends (i.e., top and bottom in FIG. 3). However, rather than simply being flush with the terminal ends of linear substrate 308, at least a portion 334 of a periphery 314 of planar light guide 310 not parallel to linear substrate 318, i.e., at top and bottom in FIG. 3, are curved to redirect light emitted by the at least one light source 306 towards light extraction feature 312. For instance, light emitted by light sources 306a, 306j, 306k and 306t may be reflected as shown by the dashed arrows off of portion 334 of planar light guide. In various embodiments, an inward face 336 of portion 334 of planar light guide 310 may be made reflective, e.g., using reflective tape or other similar techniques. In some embodiments, such as the one depicted in FIG. 3, portion 334 of planar light guide 310 is curved inwardly.

As noted above, light extraction feature 312 may take various forms. In some embodiments, light extraction feature 312 may include a modulated dot pattern, e.g., of various shapes such as hexagons, squares or diamonds. In some embodiments, light extraction feature(s) 312 may be laser etched into the planar light guide. In various embodiments, dots of the pattern forming light extraction feature 312 may be silk-screened into planar light guide 310. In some embodiments, light extraction feature 312 includes micro-lenses thermally embossed into planar light guide 310. In some embodiments, light extraction feature 312 includes microstructure film laminated on rigid acrylic panels of planar light guide 310.

In various embodiments, light extraction feature 312 may include a distribution of individual light extraction features (of one or more of the types described above). In some embodiments, a density of the distribution of individual light extraction features may be lower near each of plurality of light sources 306 than elsewhere in planar light guide 310.

Figure 4:
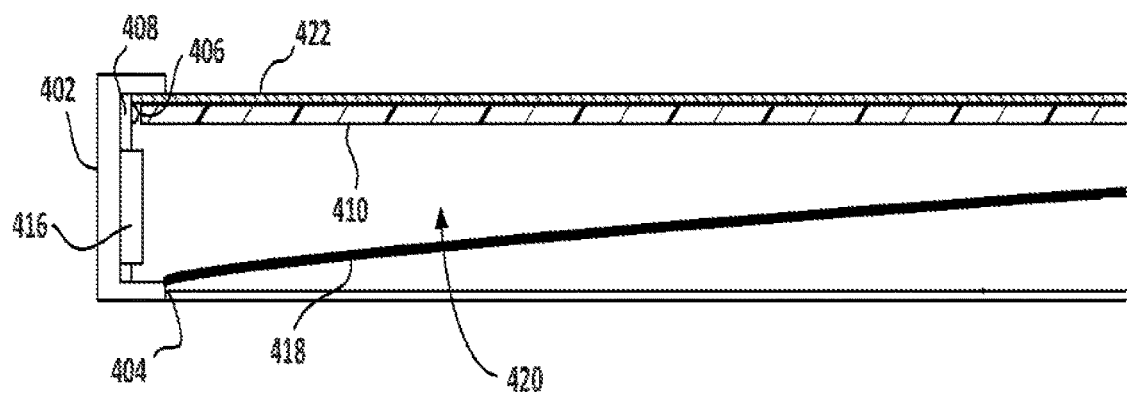
FIG. 4 depicts a side view of a panel luminaire with selected aspects of the present disclosure, in accordance with various embodiments.

In another aspect, FIG. 4 depicts a side view of a panel luminaire 400 that is designed to permit incorporation of one or more three-dimensional features. Panel luminaire 400 may include a housing 402 that, similarly to panel luminaire 100 in FIGS. 1-3, frames a light aperture 404. A linear substrate 408 once again may be mounted to housing 402 along a first plane defined by housing (across the page in FIG. 4). At least one light source 406 may be mounted along linear substrate 408 to emit light along the plane of housing 402. While not depicted in FIG. 4, in some embodiments, another linear substrate 408 and corresponding light sources 406 may be positioned oppositely from the linear substrate 408 and light sources depicted in FIG. 4. Also depicted in FIG. 4 is a power connector 416 that may be coupled with a power supply, such as AC mains, and a reflective surface 422 to reflect light downward.

A planar light guide 410 may be mounted to housing 402 parallel to the plane defined by housing 402. An aesthetic panel 418 may be positioned across light aperture 404. In various embodiments, planar light guide 410 and aesthetic panel 418 of luminaire 400 may be spaced apart by various distances to form a gap 420. Gap 420 may be various sizes, shapes, and/or dimensions, depending on a size, shape and/or dimension of aesthetic panel 418. In various embodiments, aesthetic panel 418 may be translucent, transparent, and so forth. In some embodiments, aesthetic panel 418 may be diffusive.

Including gap 420 between planar light guide 410 and aesthetic panel 418 enables aesthetic panel 418 to include one or more three dimensional features. For example, in FIG. 4, aesthetic panel 418 is curved three dimensionally to alter light emitted by planar light guide 410. Aesthetic panel 418 may in some embodiments take the form of a sheet of non-glare acrylic that forms an arc. In various embodiments, a film may be applied on top of the non-glare acrylic, e.g., to redirect light into various forms or shapes, such as a "batwing." In some embodiments, holographic features may be incorporated into aesthetic panel 418, e.g., to enhance light redirection. Having gap 420 between these components may also create a light mixing volume, which may reduce flaring when a passerby looks directly at panel luminaire 400.

Figure 5:
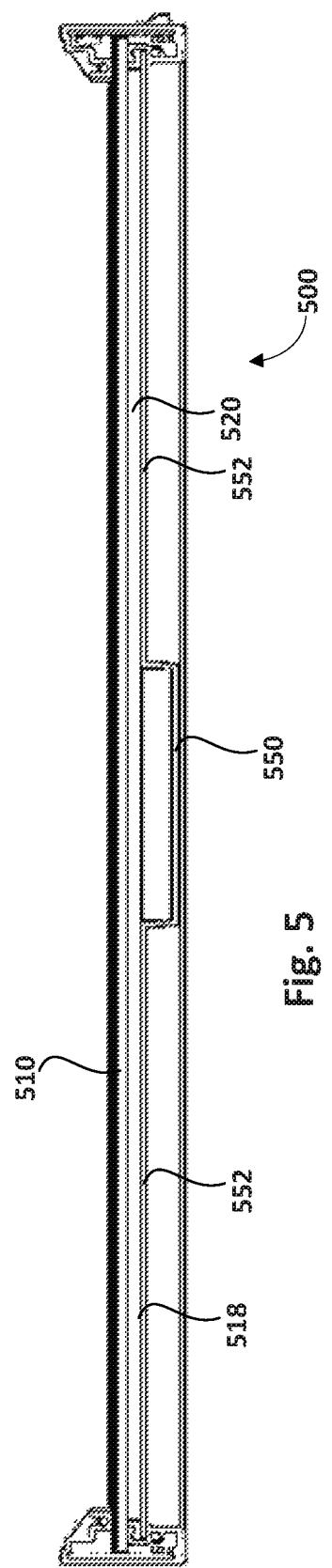
FIG. 5 depicts a side view of a panel luminaire with selected aspects of the present disclosure, in accordance with various embodiments.

FIG. 5 depicts another example panel luminaire 500 that is similar to that of FIG. 4 in most respects (and thus, most components are not labeled for the sake of brevity). In FIG. 5, aesthetic panel 518 takes a slightly different three dimensional shape than the curved aesthetic panel 418 of FIG. 4. In particular, aesthetic panel 518 includes an extrusion 550 flanked by two valley portions 552. This is just one more example of the type of three dimensional feature that is possible when planar light guide 510 and aesthetic panel 518 are separated by gap 520.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A panel luminaire comprising:
   a housing that frames a light aperture;
   a linear substrate mounted to the housing along a first plane;
   at least one light source mounted along the linear substrate to emit light along the first plane; and
   a planar light guide mounted to the housing parallel to the first plane and including a light extraction feature to extract light emitted by the at least one light source, wherein at least a portion of a periphery of the planar light guide not parallel to the linear substrate is curved to redirect light emitted by the at least one light source towards the light extraction feature, and wherein an inward face of the portion of the periphery not parallel to the linear substrate is reflective.

2. The panel luminaire of claim 1, wherein the portion of the periphery not parallel to the linear substrate is curved inwardly.

3. The panel luminaire of claim 1, wherein the light extraction feature comprises a modulated dot pattern.

4. The panel luminaire of claim 3, wherein dots of the dot pattern include hexagons, squares, circles or diamonds.

5. The panel luminaire of claim 3, wherein dots of the dot pattern are laser etched into the planar light guide.

6. The panel luminaire of claim 3, wherein dots of the dot pattern are silk-screened into the planar light guide.

7. The panel luminaire of claim 1, wherein the light extraction feature comprises micro-lenses thermally embossed into the planar light guide.

8. The panel luminaire of claim 1, wherein the light extraction feature comprises microstructure film laminated on rigid acrylic panels.

9. The panel luminaire of claim 1, wherein the light extraction feature comprises a distribution of individual light extraction features and the at least one light source comprises a plurality of light sources, wherein a density of the distribution is lower near each of the plurality of light sources than elsewhere in the planar light guide.

10. The panel luminaire of claim 1, further comprising an aesthetic panel positioned across the light aperture and parallel to the planar light guide, wherein the planar light guide and the aesthetic panel are spaced apart to form a gap therebetween.

11. A panel luminaire comprising:
    a housing that frames a light aperture
    a linear substrate mounted to the housing along a first plane;
    at least one light source mounted along the linear substrate to emit light along the first plane;
    a planar light guide mounted to the housing parallel to the first plane; and
    an aesthetic panel positioned across the light aperture and parallel to the planar light guide, wherein the planar light guide and the aesthetic panel are spaced apart to form a gap therebetween, and wherein an inward face of the portion of the periphery not parallel to the linear substrate is reflective.

12. The panel luminaire of claim 11, wherein the planar light guide includes a light extraction feature to extract light emitted by the at least one light source.

13. The panel luminaire of claim 12, wherein at least a portion of a periphery of the planar light guide not parallel to the linear substrate is curved to redirect light emitted by the at least one light source towards the light extraction feature.

* * * * *